(12) United States Patent
Nishikawa et al.

(10) Patent No.: US 6,779,612 B2
(45) Date of Patent: Aug. 24, 2004

(54) POWER TOOL HAVING AIR DISCHARGE WINDOWS

(75) Inventors: Tomomasa Nishikawa, Hitachinaka (JP); Shinki Ohtsu, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/317,112

(22) Filed: Dec. 12, 2002

(65) Prior Publication Data

US 2003/0111918 A1 Jun. 19, 2003

(30) Foreign Application Priority Data

Dec. 14, 2001 (JP) .................................... P2001-382000

(51) Int. Cl.⁷ ................................................ B25F 5/00
(52) U.S. Cl. ...................................... 173/217; 173/171
(58) Field of Search ................................ 173/217, 171

(56) References Cited

U.S. PATENT DOCUMENTS

| | | | | |
|---|---|---|---|---|
| 2,155,082 A | * | 4/1939 | Decker | 173/217 |
| 2,456,571 A | * | 12/1948 | Turner et al. | 310/50 |
| 2,517,882 A | * | 8/1950 | Johnson | 173/46 |
| 3,788,603 A | * | 1/1974 | Snider | 251/345 |
| 5,383,771 A | * | 1/1995 | Ghode et al. | 418/15 |
| 5,591,070 A | * | 1/1997 | Kachich | 451/295 |
| 5,799,739 A | * | 9/1998 | Takaada et al. | 173/217 |
| 5,992,540 A | * | 11/1999 | Smolinski et al. | 173/169 |
| 6,325,157 B1 | * | 12/2001 | Arakawa et al. | 173/201 |
| 6,543,549 B1 | * | 4/2003 | Riedl et al. | 173/216 |

FOREIGN PATENT DOCUMENTS

| JP | 11-10558 | 1/1999 |
|---|---|---|
| JP | 11-333761 | 12/1999 |

* cited by examiner

Primary Examiner—Rinaldi I. Rada
Assistant Examiner—Brian Nash
(74) Attorney, Agent, or Firm—Sughrue Mion, PLLC

(57) ABSTRACT

A power tool providing a smooth cooling air flow discharging through discharge windows formed in a housing. In the housing a radial fan is rotatably provided for cooling a heated motor. A cooling air generated by the radial fan is discharged through the discharge windows. Each discharge window has a rectangular shape having an upstream side and a downstream side in the rotating direction of the cooling fan. A chamfered portion is provided at least at the upstream side and in an inner peripheral surface of the housing, so that a thickness of the housing wall is gradually small in the rotating direction. The chamfered portion increases an effective area of the window for discharging air.

16 Claims, 3 Drawing Sheets

POWER TOOL HAVING AIR DISCHARGE WINDOWS

BACKGROUND OF THE INVENTION

The present invention relates to a power tool having air discharge windows, and more particularly, to a two-way rotatable power tool that has a radial fan for a cooling purpose.

FIG. 6 shows a conventional two-way rotatable power tool with a cooling fan. A two-way rotatable power tool is a power tool that can rotate both in the forward direction and in the reverse direction. The power tool includes a housing 103, and a motor (not shown) and a cooling fan 2 those positioned in the housing 103. The motor is provided with an armature and a stator. The cooling fan 2 is connected to the armature so as to rotate with the armature. The housing 103 has a part defining a fan chamber 105 for housing therein the cooling fan 2. Discharge windows 104 are formed in the housing part and are arrayed in a circumferential direction of the housing 103.

With the above-described configuration, when the motor is supplied with power, the cooling fan 2 rotates with the armature. The cooling fan draws air and generates air flow in an axial direction of the motor, so that heated components such as the motor can be cooled. The air is subsequently ejected from the discharge windows 104 in a direction indicated by an arrow 7.

One measure to improve cooling performance is to increase airflow rate by the cooling fan 2, and it is possible to increase the airflow rate by increasing the area of the discharge windows 104. If the area of the discharge windows 104 is excessively large, however, a user may get his fingers into the discharge windows 104 and touch the cooling fan 2 by mistake. Further, the strength of the housing 103 deteriorates if the area of the discharge windows 104 is excessively large.

In addition, as shown in FIG. 6, when the cooling fan 2 rotates in a rotational direction indicated by an arrow 6, air flow occurs in the direction indicated by the arrow 7. This causes vortex flows 8 that generate noise.

SUMMARY OF THE INVENTION

It is an object of the present invention to overcome the above-described problems and to provide an improved power tool capable of increasing an effective area of the discharge window without increasing an external or projection area thereof to thus increase an amount of air flow passing through the window.

Another object of the present invention is to provide such power tool capable of providing a smooth air discharging flow without vortex and noise.

These and other objects of the present invention will be attained by a power tool including an improved housing, a motor, and a cooling fan. The housing has a part defining a fan chamber and has outer and inner circumferential surfaces. The part of the housing is formed with at least one discharge window extending in a circumferential direction of the housing for allowing air to pass therethrough from the fan chamber to an atmosphere. The motor is disposed in the housing and includes an armature and a stator. The motor is rotatable in a first rotating direction and a second rotating direction opposite to the first rotating direction. The cooling fan is connected to the armature and is rotatable together with the armature. The cooling fan is disposed in the fan chamber. The at least one discharge window has a first side and a second side in opposition to the first side in the first and second rotating directions. The first side has a first slant wall portion at the inner circumferential surface to gradually reduce a thickness of the housing in the first rotating direction. The second side has a second slant wall portion at the inner circumferential surface to gradually reduce a thickness of the housing in the second rotating direction.

DETAILED DESCRIPTION OF THE PREFERRED EMBODIMENTS

A power tool according to a first embodiment of the present invention will be described with reference to FIGS. 1 through 4.

Figure 1:
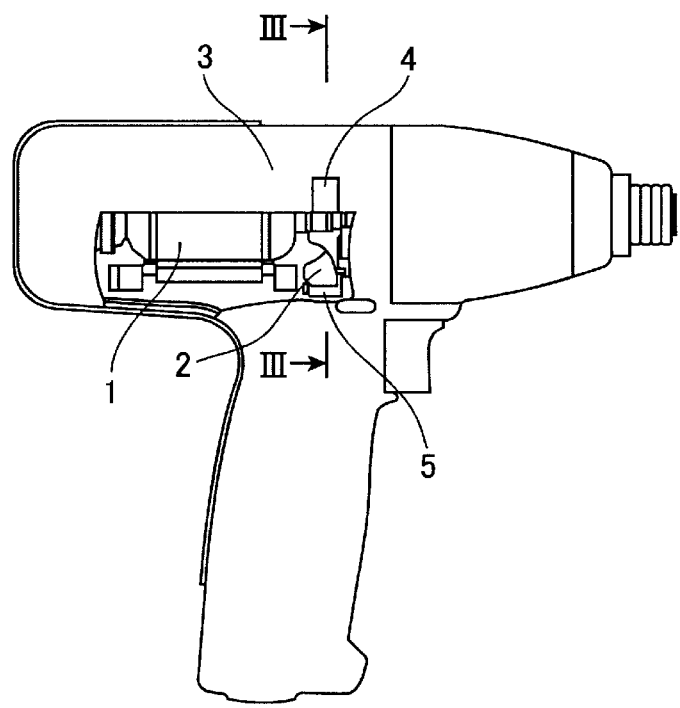
FIG. 1 is a side view with a part being cutaway showing a two-way rotatable power tool with a cooling fan according to a first embodiment of the present invention.
Figure 2:
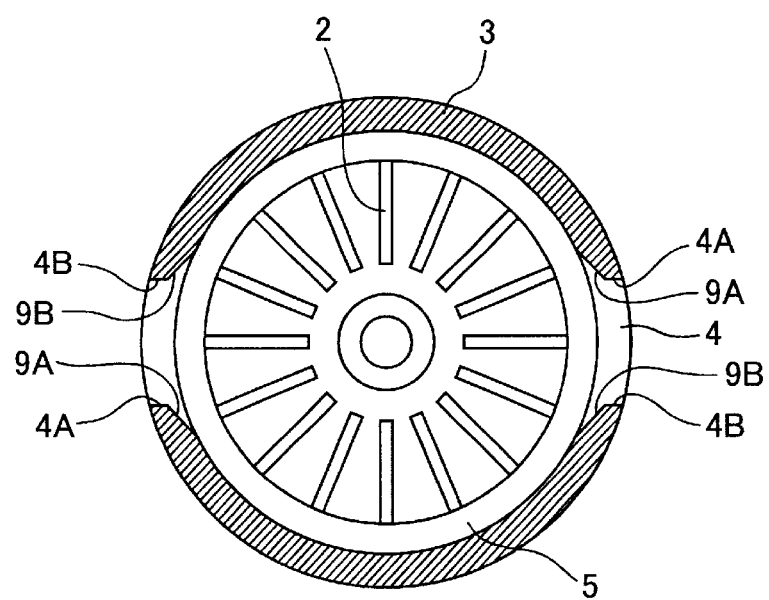
FIG. 2 is a cross-sectional view showing the cooling fan of the power tool according to the first embodiment.
Figure 3:
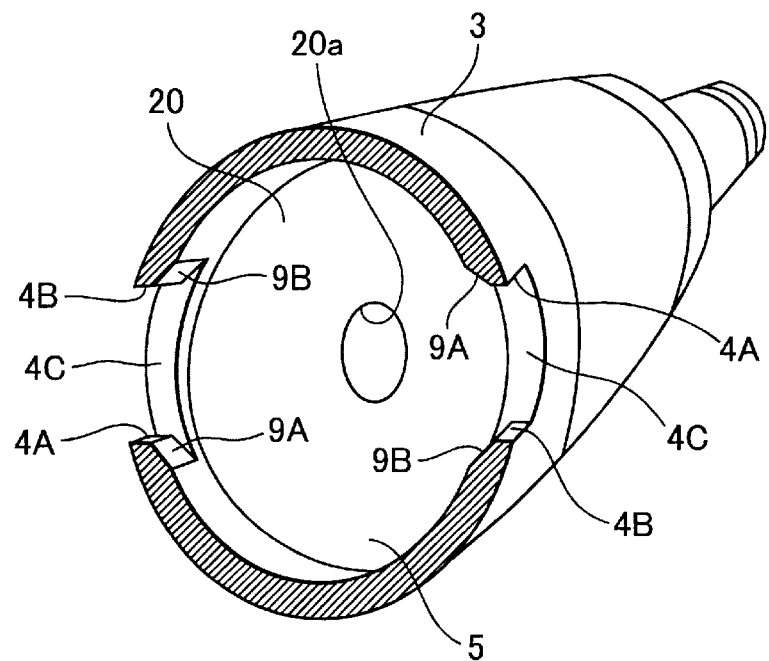
FIG. 3 is a perspective view as viewed from an arrow III—III of FIG. 1 for particularly showing discharge windows in the first embodiment.

As shown in FIGS. 1 to 3, a power tool includes a housing 3, and a motor 1 and a cooling fan 2 those positioned in the housing 3. The cooling fan 2 is a radial type fan. The motor 1 is provided with an armature and a stator (not shown in the drawings). The cooling fan 2 is connected to the armature so as to rotate with the armature.

In the housing 4 and in front of the cooling fan 2, a partition wall 20 is provided, so that a fan chamber 5 is defined by a part of the housing 4 and the partition wall 20 for housing the cooling fan 2. The partition wall 20 is formed with a central bore 20a through which an output shaft or other power transmission shaft extends.

Discharge windows 4 are formed in the housing part and are arrayed in a circumferential direction of the housing 3. Each discharge window 4 has a generally rectangular shape defining a window frame faces 4A, 4B, 4C (4D is not shown) extending substantially perpendicular to a peripheral surface of the housing 3. These window frame faces 4A through 4D define an external contour of the discharge window 4. The window frame faces 4A and 4B are positioned at downstream and upstream sides in the rotating direction of the cooling fan 2. Slant wall portions or chamfered portions 9A, 9B reaching the downstream and upstream sides window faces 4A and 4B edges are formed on an inner peripheral surface of the housing 3, so that a thickness of the housing 3 is gradually small toward the window frame faces 4A, 4B. Joining portion between the chamfered portion 9A and the window face 4A and between other chamfered portion 9B and the window frame face 4B are rounded or chamfered. Obviously, an angle between the chamfered portion 9 and a tangential line of the inner circumference of the housing 3 is less than 90 degrees.

With the above-described configuration, upon power supply to the motor 1, the cooling fan 2 rotates with the armature. The cooling fan 2 draws air and generates air flow in an axial direction of the motor 1, so that heated components such as the motor 1 can be cooled. The air is subsequently ejected from the discharge windows 4.

Figure 4:
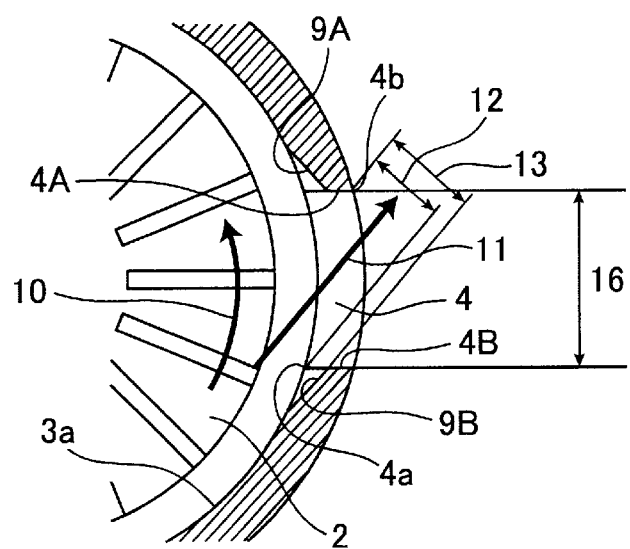
FIG. 4 is an enlarged cross-sectional view for description of the discharge window.

In FIG. 4, when the cooling fan 2 rotates in a direction indicated by an arrow 10, air flow directing through the discharge window 4 also occurs in a direction indicated by an arrow 11. If an upstream side chamfered portion 9B is not formed, an effective area of the discharge window 4 with respect to the air flow 11 is defined by an edgeline 4a which is an intersection between the upstream side window frame face 4B and an extension of an inner peripheral surface 3a of the housing 3, and by an edgeline 4b which is an intersection between the downstream side window frame face 4A and the outer peripheral surface of the housing 3. In other words, the resultant discharge window has an effective area indicated by a width 12 in FIG. 4. On the other hand, if the upstream side chamfered portion 9B is formed, the discharge window 4 has an increased effective area with respect to the air flow 11 as indicated by width 13. The same effect can also be achieved when the cooling fan 2 rotates in a direction opposite to the arrow 10 by forming the downstream side chamfered portion 9A.

Thus, the discharge window 4 has an increased effective area for the discharging air flow 11 by forming the chamfered portions 9B (and 9A in case of the reverse rotation), while the external area of the discharge window 4 remains the same as indicated by a width 16. This prevents a user's finger from getting into the discharge window 4 and ensures his safety. Also, air flows smoothly and effectively through each discharge window 4 without vortex flows and generation of noise because the chamfered portions 9A and 9B are formed.

Figure 5:
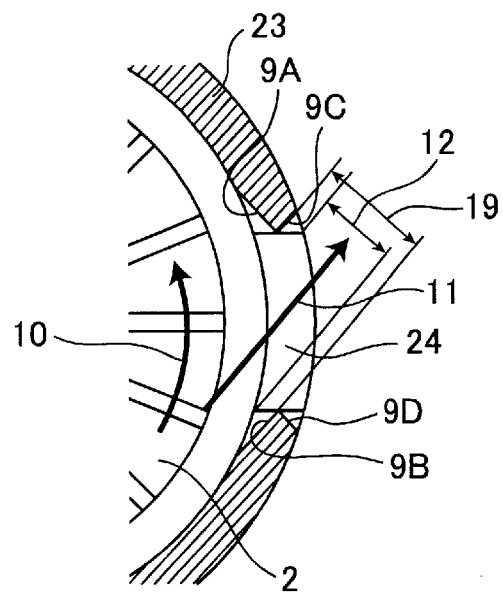
FIG. 5 is an enlarged cross-sectional view for description of a discharge window according to a second embodiment of the present invention.
Figure 6:
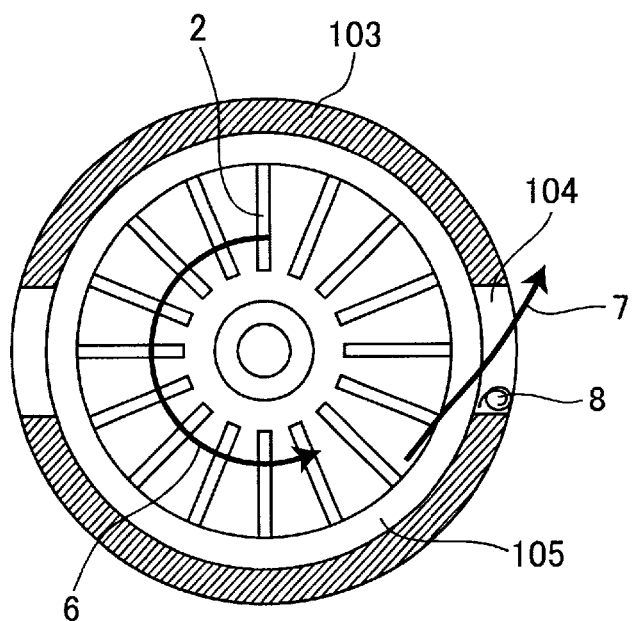
FIG. 6 is a cross-sectional view showing a cooling fan and discharge windows according to a conventional power tool.

A power tool according to a second embodiment of the present invention will be described with reference to FIG. 5. In the second embodiment, in addition to the chamfered portions 9A and 9B on the inner circumference of the housing 3, additional chamfered portions 9C and 9D are also formed on the outer circumference of the housing 23. With this configuration, a discharge window 24 can provide an increased effective area for discharging air flow as indicated by a width 19. In other words, the width 19 is greater than the width 13 of the first embodiment because of the formation of the outer chamfered portion 9C. Thus, discharging air flows more smoothly through the discharge window 24.

While the invention has been described in detail with reference to the specific embodiments thereof, it would be apparent to those skilled in the art that various changes and modifications may be made therein without departing from the spirit and scope of the invention. For example, in the depicted embodiment, two discharge windows are formed in the housing. However, the numbers of the windows is not limited to the illustrated embodiment as far as sufficient air discharge can be performed.

Further, in the depicted embodiment, the reversible motor is provided, and the chamfered portions 9A and 9B are provided at both downstream and upstream sides of the window. However, if the motor is used only in a single rotating direction, the chamfered portion can be provided only at the upstream side of the window.

What is claimed is:

1. A power tool comprising:
    a housing having a part defining a fan chamber and having outer and inner circumferential surfaces, the part of the housing being formed with at least one discharge window extending in a circumferential direction of the housing for allowing air to pass therethrough from the fan chamber to an atmosphere;
    a motor disposed in the housing and comprising an armature and a stator, the motor being rotatable in a first rotating direction and a second rotating direction opposite to the first rotating direction; and
    a cooling fan connected to the armature and rotatable together with the armature, the cooling fan being disposed in the fan chamber; and
    wherein the at least one discharge window is defined by at least a first wall portion and a second wall portion in opposition to the first wall portion in the circumferential direction, the first wall portion connecting the inner circumferential surface and the outer circumferential surface, and the a second wall portion connecting the inner circumferential surface and the outer circumferential surface,
    wherein at least a part of the first wall portion that is adjacent to the inner circumferential surface is inclined to the inner circumferential surface, and
    wherein at least a part of the second wall portion that is adjacent to the inner circumferential surface is inclined to the inner circumferential surface and substantially opposite to an inclination of the inclined part of the first wall portion, allowing a distance between the inclined part first wall portion and the inclined part of the second wall portion to be gradually reduced toward a radially outward direction of the housing.

2. The power tool as claimed in claim 1, wherein the first wall portion includes a first inner slant wall portion and a first perpendicular plane, the first inner slant wall portion being formed at the inner circumferential surface to gradually reduce a thickness of the housing in the first rotating direction, the first perpendicular plane extending substantially perpendicular to the outer circumferential surface of the housing, the first inner slant wall portion being intersected with the first perpendicular plane to provide an open end of the window.

3. The power tool as claimed in claim 2, wherein the second wall portion includes a second inner slant wall portion and a second perpendicular plane, the second inner slant wall portion being formed at the inner circumferential surface to gradually reduce a thickness of the housing in the second rotating direction, the second perpendicular plane extending substantially perpendicular to the outer circumferential surface of the housing, the second inner slant wall portion being intersected with the second perpendicular plane to provide another open end of the window.

4. The power tool as claimed in claim 2, wherein one of an arcuate surface and a chamfered surface is formed at the intersection.

5. The power tool as claimed in claim 1, wherein the first wall portion includes a first inner slant wall portion and a first outer slant wall portion, the first inner slant wall portion being formed at the inner circumferential surface to gradually reduce a thickness of the housing in the first rotating direction, the first outer slant wall portion being formed at the outer circumferential surface of the housing to gradually increase a thickness of the housing in the second rotating direction.

6. The power tool as claimed in claim 5, wherein the second wall portion includes a second inner slant wall portion and a second outer slant wall portion, the second inner slant wall portion being formed at the inner circumferential surface to gradually reduce a thickness of the housing in the second rotating direction, the second outer slant wall portion being formed at the outer circumferential surface of the housing to gradually increase the thickness of the housing in the first rotating direction.

7. The power tool as claimed in claim 1, wherein the distance between the first wall portion and the second wall portion is gradually reduced from the inner circumferential surface to a substantially intermediate point between the inner and outer circumferential surfaces, and wherein the distance between the first wall portion and the second wall portion is substantially constant from the substantially intermediate point to the outer circumferential surface.

8. The power tool as claimed in claim 1, wherein the distance between the first wall portion and the second wall portion is gradually reduced from the inner circumferential surface to a substantially intermediate point between the inner and outer circumferential surfaces, and wherein the distance between the first wall portion and the second wall portion is gradually increased from the substantially intermediate point to the outer circumferential surface.

9. A power tool comprising:

a housing having a part defining a fan chamber and having outer and inner circumferential surfaces, the part of the housing being formed with at least two discharge windows, each of the at least two discharge windows extending in a circumferential direction of the housing for allowing air to pass therethrough from the fan chamber to an atmosphere, the at least two discharge windows being arrayed in the circumferential direction;

a motor disposed in the housing and comprising an armature and a stator, the motor being rotatable in a first rotating direction and a second rotating direction opposite to the first rotating direction; and a cooling fan connected to the armature and rotatable together with the armature, the cooling fan being disposed in the fan chamber, wherein each of the at least two discharge windows is defined by at least a first wall portion and a second wall portion in opposition to the first wall portion in the circumferential direction, the first wall portion connecting the inner circumferential surface and the outer circumferential surface, and the second wall portion connecting the inner circumferential surface and the outer circumferential surface, wherein at least a part of the first wall portion that is adjacent to the inner circumferential surface is inclined to the inner circumferential surface; and wherein at least a part of the second wall portion that is adjacent to the inner circumferential surface is inclined to the inner circumferential surface and substantially opposite to an inclination of the inclined part of the first wall portion allowing a distance between the inclined part of the first wall portion and the inclined part of the second wall portion to be gradually reduced toward a radially outward direction of the housing.

10. The power tool as claimed in claim 9, wherein the first wall portion includes a first inner slant wall portion and a first perpendicular plane, the first inner slant wall portion being formed at the inner circumferential surface to gradually reduce a thickness of the housing in the first rotating direction, the first perpendicular plane extending substantially perpendicular to the outer circumferential surface of the housing, the first inner slant wall portion being intersected with the first perpendicular plane to provide an open end of the window.

11. The power tool as claimed in claim 10, wherein the second wall portion includes a second inner slant wall portion and a second perpendicular plane, the second inner slant wall portion being formed at the inner circumferential surface to gradually reduce a thickness of the housing in the second rotating direction, the second perpendicular plane extending substantially perpendicular to the outer circumferential surface of the housing, the second inner slant wall portion being intersected with the second perpendicular plane to provide another open end of the window.

12. The power tool as claimed in claim 10, wherein one of an arcuate surface and a chamfered surface is formed at the intersection.

13. The power tool as claimed in claim 9, wherein the first wall portion includes a first inner slant wall portion and a first outer slant wall portion, the first inner slant wall portion being formed at the inner circumferential surface to gradually reduce a thickness of the housing in the first rotating direction, the first outer slant wall portion being formed at the outer circumferential surface of the housing to gradually increase a thickness of the housing in the second rotating direction.

14. The power tool as claimed in claim 13, wherein the second wall portion includes a second inner slant wall portion and a second outer slant wall portion, the second inner slant wall portion being formed at the inner circumferential surface to gradually reduce a thickness of the housing in the second rotating direction, the second outer slant wall portion being formed at the outer circumferential surface of the housing to gradually increase the thickness of the housing in the first rotating direction.

15. The power tool as claimed in claim 9, wherein the distance between the first wall portion and the second wall portion is gradually reduced from the inner circumferential surface to a substantially intermediate point between the inner and outer circumferential surfaces, and wherein the distance between the first wall portion and the second wall portion is substantially constant from the substantially intermediate point to the outer circumferential surface.

16. The power tool as claimed in claim 9, wherein the distance between the first wall portion and the second wall portion is gradually reduced from the inner circumferential surface to a substantially intermediate point between the inner and outer circumferential surfaces, and wherein the distance between the first wall portion and the second wall portion is gradually increased from the substantially intermediate point to the outer circumferential surface.

* * * * *